(12) United States Patent
Patchen

(10) Patent No.: US 6,923,997 B2
(45) Date of Patent: Aug. 2, 2005

(54) ANTIFOGGING COMPOSITIONS AND METHODS FOR USING THE SAME

(75) Inventor: William F. Patchen, Farmington, NY (US)

(73) Assignee: Pactiv Corporation, Lake Forest, IL (US)

( * ) Notice: Subject to any disclaimer, the term of this patent is extended or adjusted under 35 U.S.C. 154(b) by 60 days.

(21) Appl. No.: 10/379,017

(22) Filed: Mar. 4, 2003

(65) Prior Publication Data

US 2005/0074557 A1 Apr. 7, 2005

(51) Int. Cl.$^7$ .............................. B05D 5/06; C09K 3/18
(52) U.S. Cl. ........................ 427/161; 427/162; 106/13; 252/70
(58) Field of Search ........................... 106/13; 252/70; 427/161, 162

(56) References Cited

U.S. PATENT DOCUMENTS

| | | | |
|---|---|---|---|
| 3,415,661 A | * 12/1968 | Sincock | ...................... 426/125 |
| 3,437,617 A | * 4/1969 | Bogle | .......................... 106/13 |
| 3,479,308 A | * 11/1969 | Gattenby, Jr. et al. | ...... 524/110 |
| 3,819,522 A | 6/1974 | Zmoda et al. | |
| 3,856,534 A | * 12/1974 | Fletcher et al. | ................ 106/13 |
| 4,965,136 A | 10/1990 | Mueller | |
| 5,030,280 A | * 7/1991 | Hoefer et al. | .................. 106/13 |
| 5,108,660 A | 4/1992 | Michael | |
| 5,614,297 A | 3/1997 | Velazquez | |
| 5,716,921 A | 2/1998 | Neumiller | |
| 5,977,050 A | 11/1999 | Faris | |
| 6,040,053 A | 3/2000 | Scholz et al. | |
| 6,296,694 B1 | * 10/2001 | Miller | .......................... 106/13 |

FOREIGN PATENT DOCUMENTS

| | | | | |
|---|---|---|---|---|
| CN | 1172142 A | * | 2/1998 | ............ C09K/3/18 |
| FR | 1569130 A | * | 5/1969 | |

OTHER PUBLICATIONS

USPTO obtained translation of CN 1172142–A.*
Derwent abstract ACC–No.:1968–15586Q of FR 1569130–A.*
Material Safety Data Sheet for Atmer 100 dated Jan. 22, 1987 (3 pages).
Material Safety Data Sheet for Atmer 645 dated Mar. 7, 1989 (4 pages).
Material Safety Data Sheet for PA–1074 dated Jun. 10, 1992 (4 pages).
Material Safety Data Sheet for Atmer 645 dated Sep. 25, 1996 (5 pages).
Website printouts from www.cibasc.com dated Aug. 20, 2002 (8 pages).
Website printout from www.cibasc.com dated Sep. 5, 2002 (1 page).

* cited by examiner

Primary Examiner—Matthew A. Thexton
(74) Attorney, Agent, or Firm—Winston & Strawn LLP

(57) ABSTRACT

An antifogging composition for food packaging containers comprising (i) an antifogging nonionic surfactant blend comprising a fatty acid ester and an ethoxylated compound and (ii) acetone. An antifogging composition comprising (i) an antifogging nonionic surfactant blend comprising a fatty acid ester and an ethoxylated compound and (ii) a solvent selected from methyl acetate, isopropyl alcohol, ethanol, and mixtures thereof. A method of defogging a food packaging container surface comprising selecting a surface; providing (i) an antifogging nonionic surfactant blend comprising a fatty acid ester and an ethoxylated compound and (ii) acetone to form an antifogging composition; and applying the antifogging composition to the surface. A method of defogging a food packaging container surface comprising selecting a surface; providing (i) an antifogging nonionic surfactant blend comprising a fatty acid ester and an ethoxylated compound and (ii) a solvent selected from methyl acetate, isopropyl alcohol, ethanol, and mixtures thereof to form an antifogging composition; and applying the antifogging composition to the surface.

27 Claims, No Drawings

ANTIFOGGING COMPOSITIONS AND METHODS FOR USING THE SAME

FIELD OF THE INVENTION

The present invention relates generally to antifogging compositions useful for coating plastic food containers and methods of using such antifogging compositions. More particularly, the invention relates to antifogging compositions for food packaging containers with improved application properties and methods of using such antifogging compositions.

BACKGROUND OF THE INVENTION

Food packaging containers such as thermoformed plastic containers are in widespread use in a varied and diverse number of household and commercial applications. Some food packaging containers are designed to be used in warming equipment so as to maintain the stored food at an adequate temperature. One such example is a storage container consisting of a talc filled polypropylene base with a lid made of oriented polystyrene which is designed to be used in a warming bin for warming a whole roasted chicken. One problem involved in using food packaging containers for food warming and/or display of hot foods is that condensation droplets form and the food packaging containers become fogged when the container contents are heated. The presence of obscuring fog limits the ability of the consumer to view the contents of the food packaging container, thereby obscuring the food contents and detracting from the marketability of the food product.

One method that has been used to alleviate fogging of food packaging containers during warming and/or display of hot foods has been to compound additives with the polymeric material used to make the container. In this method, the additives migrate to the container surface to reduce fog build-up. The additives are typically added to the polymer in concentrations ranging from about 1% to about 5% by weight. Examples include Glycolube PG and Glycolube AFA-1 available from Lonza of Fair Lawn, N.J. These types of additives, however, are typically useful only with containers made from polyethylene and polyvinyl chloride (PVC) and typically cannot be used with containers made from polystyrene. Materials that migrate to the surface require a matrix which allows sufficient molecular mobility to maintain a sufficient surface concentration of antifog agent to maintain a fog-free surface. Particularly in a warm environment, the antifog material is prone to being washed from the surface, and any additive used with the polymeric material would need to bloom very quickly to maintain adequate performance. While polyethylene and flexible PVC are typically used above their glass transition temperatures and experience efficient blooming, polystyrene is used well below its glass transition temperature which greatly slows the blooming process for polystryene.

Another method that has been used to alleviate fogging of food packaging containers during warming and/or display of hot foods has been to apply a coating of an antifogging nonionic surfactant blend to the surface(s) of the food packaging containers. The ability to apply a coating of an antifogging nonionic surfactant blend to the surface(s) of food packaging containers, however, is typically limited by the viscous nature of the antifogging nonionic surfactant blend. Antifogging nonionic surfactant blends are typically very viscous at room temperature, making a spray application without an extra heating step difficult. Another handling problem associated with antifogging nonionic surfactant blends involves solidification of these viscous materials at temperatures below ambient conditions. As a result, the antifogging nonionic surfactant blends must be stored in temperature-controlled environments so that the user may pump the antifogging nonionic surfactant blends from their storage containers.

Although heating these antifogging nonionic surfactant blends decreases the viscosity and alleviates some of the aforementioned handling problems, the spray pattern and coating weight of these blends often remain difficult to control even at elevated temperatures. This results in uneven coating of the food packaging container and requires the application of additional material to provide adequate coverage. This results in waste of material, variable product performance, and the use of excessive material on the food packaging container which can be unsightly. In addition, the heating step which is generally required to apply these antifogging nonionic surfactant blends involves additional processing steps and equipment, which increases the processing costs.

Accordingly, there exists a need for antifogging compositions that can be used on containers which are made from a variety of materials including polystyrene. There also exists a need for antifogging compositions that can be used to alleviate the formation of condensation droplets and fogging of food packaging containers during warming and/or display of hot foods while overcoming the processing and handling problems discussed above. There further exists a need for antifogging compositions that can be applied at room temperature without the processing and handling problems discussed above. In addition, a need exists for methods of using these antifogging compositions.

SUMMARY OF THE INVENTION

The above needs are met by embodiments of the invention in one or more of the following aspects. In one aspect, the invention relates to antifogging compositions for alleviating or reducing the formation of condensation droplets and the accumulation of fog in various food packaging containers. The antifogging composition comprises (i) an antifogging nonionic surfactant blend comprising a fatty acid ester and an ethoxylated compound and (ii) a solvent selected from acetone, methyl acetate, isopropyl alcohol, ethanol, and mixtures thereof The fatty acid ester may be a sorbitan ester. The ethoxylated compound may be a mixture of an ethoxylated alkyl phenol and a mixed glyceride with a $C_8$ to $C_{20}$ fatty acid adduct. In another aspect, the invention relates to methods of using antifogging compositions to alleviate or reduce the formation of condensation droplets and the accumulation of fog in various food packaging containers. The method comprises selecting a surface for defogging; providing (i) an antifogging nonionic surfactant blend comprising a fatty acid ester and an ethoxylated compound and (ii) a solvent selected from acetone, methyl acetate, isopropyl alcohol, ethanol, and mixtures thereof to form an antifogging composition; and applying the antifogging composition to the surface. The fatty acid ester may be a sorbitan ester. The ethoxylated compound may be a mixture of an ethoxylated alkyl phenol and a mixed glyceride with a $C_8$ to $C_{20}$ fatty acid adduct. The surface may be polyethylene, polyvinyl chloride, polystyrene, polypropylene, or polyethylene terephthalate.

Additional aspects of the invention and advantages provided by the embodiments of the invention are apparent with the following description.

DESCRIPTION OF EMBODIMENTS OF THE INVENTION

Embodiments of the invention provide new antifogging compositions that alleviate the formation of condensation droplets and the accumulation of fog on the surfaces of food packaging containers which can be easily applied to food packaging containers made from a variety of materials. Embodiments of the invention further provide methods of using such antifogging compositions.

The inventive antifogging compositions comprise a solvent and an antifogging nonionic surfactant blend. The solvent is selected from acetone, methyl acetate, isopropyl alcohol, ethanol, and mixtures thereof. The antifogging nonionic surfactant blend comprises a blend of nonionic surfactants comprising a fatty acid ester and an ethoxylated compound. In one embodiment, the antifogging nonionic surfactant blend comprises a blend of (i) a fatty acid ester and (ii) a mixture of an ethoxylated alkyl phenol and a mixed glyceride with a $C_8$ to $C_{20}$ fatty acid adduct. The fatty acid ester may be a sorbitan ester such as, but not limited to, sorbitan monolaurate.

Embodiments of the invention also provide methods of using the inventive antifogging compositions to alleviate the formation of condensation droplets and the accumulation of fog on the surfaces of food packaging containers during warming. The antifogging compositions are applied as a coating to surfaces of food packaging containers and, particularly, to the internal surfaces of food packaging containers.

The antifogging composition may be applied at or near room temperature onto the surface of a food packaging container. The antifogging composition may optionally be warmed to temperatures ranging from ambient conditions to about 160° F. (about 70° C.) and applied warmed onto the surface(s) of a food packaging container.

In certain embodiments, the inventive antifogging compositions have a viscosity ranging from about 20 centipoise (cPs) to about 500 centipoise (cPs) at room temperature. In certain other embodiments, the inventive antifogging compositions have a viscosity ranging from about 50 centipoise (cPs) to about 100 centipoise (cPs) at room temperature. The addition of a solvent to the antifogging nonionic surfactant blend results in a reduction of the viscosity of the antifogging nonionic surfactant blend. The antifogging compositions described herein can be applied to food packaging containers without handling difficulties and with improved application time because the antifogging compositions are liquid in form and easily handled.

The antifogging compositions can be applied in various manners to the surface(s) of food packaging containers. It is contemplated that the antifogging compositions may be applied to the food packaging container surface(s) by spraying the antifogging composition onto the surface(s) using any suitable spraying device. For example, a pressurized liquid spray system such as a Nordson® sprayer available from Nordson Corporation may be used. Alternatively, a spray trigger or an aerosol may be used to spray the antifogging compositions onto the food packaging container surface(s). Other nonlimiting methods of applying the antifogging compositions onto food packaging container surface(s) include dipping the food packaging container into the antifogging composition; sponging, dabbing, or wiping the antifogging composition onto the food packaging container surface(s) with a cloth, brush, sponge, or similar application means; and any other suitable application means which serves to coat the food packaging container surface(s) with the antifogging composition.

Upon being sprayed or otherwise applied to the food packaging container surface(s), the solvent evaporates. Once the antifogging composition has been applied to the food packaging container surface(s), the antifogging composition dries and imparts an antifog coating to the food packaging container surface(s). The drying time depends upon the length of time required for the solvent in the antifogging composition to evaporate and is affected by the temperature of the antifogging composition, the ventilation, and the ambient conditions such as the humidity level and the temperature. The drying time can vary from within seconds to within several minutes depending on the ambient conditions and the solvent selected.

As the solvent component of the antifogging composition evaporates within seconds to minutes upon being applied onto the surface(s) of the food packaging container, the antifogging composition is typically allowed to dry by exposure to the ambient conditions. However, it is contemplated that heat may optionally be applied to dry the antifogging composition and speed the solvent evaporation time. Once the antifogging composition has been applied to the surface(s) of the food packaging container, the composition will remain on the surface(s) until the food packaging container is used.

It is contemplated that the antifogging compositions described herein may be used to defog the surface(s) of food packaging containers made from a variety of materials. Nonlimiting examples of suitable surfaces which can be defogged by the inventive antifogging compositions include a variety of polymeric substrates such as, but not limited to, polyethylene, polyvinyl chloride (PVC), polystyrene, polypropylene, polyethylene terephthalate (PET), and other suitable rigid plastic packaging materials.

The antifogging compositions can be used on food packaging containers intended for use in displaying and/or storing a variety of food items such as, but not limited to, whole or cut-up portions of ready-to-eat chicken such as roasted chicken, ribs, sandwiches, delicatessen items, and the like. The antifogging compositions described herein are particularly useful in defogging food packaging containers which are exposed to elevated temperatures such as in food warming devices and bins and in food warming applications such as microwaves and conventional warming ovens.

The inventive compositions and methods allow users of food packaging containers that have been warmed in food warming devices to more readily view the contents of the food packaging containers without unwanted fog build-up. These compositions and methods enhance the appearance of food packaging containers and the food items contained therein by providing generally unrestricted views of the containers' contents. These compositions and methods enhance the appearance of food packaging containers and the food items contained therein without compromising the integrity of the rigid packaging materials used in the food packaging containers.

The inventive compositions and methods also result in cost savings. A smaller amount of the antifogging nonionic surfactant blend is required to defog food packaging containers because the antifogging nonionic surfactant blend is diluted with solvent. The inventive compositions and methods further result in cost savings because the process of coating the food packaging container surface(s) with the antifogging compositions described herein is more easily controlled during application at room temperature and at elevated temperatures. The inventive compositions and methods can also result in cost savings by eliminating the equipment and energy costs related to heating the antifogging composition. Additionally, lower cost storage facilities can be utilized as the inventive antifogging compositions will not solidify in an unheated storage facility such as a warehouse.

Examples of suitable solvents for use in the antifogging composition include, but are not limited to, acetone, methyl acetate, isopropyl alcohol, ethanol, and mixtures thereof Acetone, methyl acetate, isopropyl alcohol, and ethanol are available from a variety of companies such as, but not limited to, Shell Chemical Company of Houston, Tex. It is contemplated that the solvent can include other solvents or mixtures of solvents.

The selection of the solvent and the amount of solvent selected for use in the antifogging composition depends on a variety of factors such as the flowability of the antifogging composition, environmental considerations, the temperature of the antifogging composition, the desired drying time of the antifogging composition, and the desired degree of dispersing of the components of the antifogging composition. Generally, the solvent is present in the antifogging composition in an amount from about 5 wt. % to about 50 wt. % of the antifogging composition. In certain embodiments, the solvent is present in an amount from about 10 wt. % to about 30 wt. % of the antifogging composition. In certain other embodiments, the solvent is present in an amount from about 15 wt. % to about 25 wt. % of the antifogging composition.

The use of acetone and methyl acetate may be advantageous in circumstances where limitations exist on the use of solvents because acetone and methyl acetate are not considered Volatile Organic Compounds (VOCs) as defined by the United States Environmental Protection Agency. As acetone and methyl acetate are not considered Volatile Organic Compounds or VOCs, they do not contribute to ground level ozone generation or smog in the environment.

The use of acetone and methyl acetate is particularly unexpected as a solvent choice for application onto food packaging containers made from polystyrene because acetone and methyl acetate may degrade polystyrene substrates. However, because the solvent evaporates rapidly using the methods and compositions described herein, acetone and methyl acetate and other suitable solvents may be applied to food packaging containers without damaging the food packaging container surface.

By adding a solvent selected from acetone, methyl acetate, isopropyl alcohol, ethanol, and mixtures thereof to the antifogging nonionic surfactant blend, the viscosity of the resulting antifogging composition is significantly lower than the viscosity of the antifogging nonionic surfactant blend alone. It is contemplated that the viscosity of the antifogging nonionic surfactant blend can be reduced at least 90 percent via the addition of a solvent selected from acetone, methyl acetate, isopropyl alcohol, ethanol, and mixtures thereof to the antifogging nonionic surfactant blend. For example, the viscosity of the nonionic surfactant blend can be reduced by over 90% via the addition of about 20 wt. % of an acetone solvent.

The antifogging compositions are easier to apply or spray onto food packaging containers than the antifogging nonionic surfactant blend alone. The antifogging compositions also provide improved coating of food packaging containers in comparison to the antifogging nonionic surfactant blend alone. The application of the inventive antifogging compositions can be more readily controlled than the use of the antifogging nonionic surfactant blend alone. Because the application or spray pattern can be more readily controlled with the inventive antifogging compositions, less material is required to coat food packaging container surface(s). The inventive antifogging compositions are also advantageous as a heating step is not required to apply the inventive antifogging compositions to food packaging container surface(s).

The antifogging nonionic surfactant blends used in the antifogging compositions comprise at least two components. The antifogging nonionic surfactant blend comprises a blend of nonionic surfactants comprising a fatty acid ester and an ethoxylated compound. In one embodiment, the antifogging nonionic surfactant blend comprises a blend of (i) a fatty acid ester such as, but not limited to, a sorbitan ester and (ii) a mixture of an ethoxylated alkyl phenol and a mixed glyceride with a $C_8$ to $C_{20}$ fatty acid adduct. It is contemplated that other materials may be added to the antifogging nonionic surfactant blend. The antifogging nonionic surfactant blends used in the antifogging compositions have a viscosity ranging from about 500 centipoise (cPs) to about 1500 centipoise (cPs) at room temperature.

Suitable antifogging nonionic surfactant blends for use in the compositions and methods described herein are available under the trade name Atmer® from Ciba Specialty Chemicals of Tarrytown, N.Y. Atmer® is available under the series names Atmer® 7000 and Atmer® 8000. The Atmer® 7000 and Atmer® 8000 series may take several physical forms at room temperature, e.g., liquid, paste, pellet, or solid. Atmer® is also available under the name Atmer® 674 (formerly PA-1074), which is a nonionic surfactant blend. At room temperature, Atmer® 674 has a viscosity which exceeds 1500 centipoise (cPs) and has a molasses-like consistency. Atmer® 674 has a specific gravity of 1.05 g/mL.

The selection of the amount of the antifogging nonionic surfactant blend for use in the antifogging composition depends on a variety of factors such as the desired viscosity and the spray equipment capabilities. Generally, the antifogging nonionic surfactant blend is present in an amount from about 50 wt. % to about 95 wt. % of the antifogging composition. In certain embodiments, the antifogging nonionic surfactant blend is present in an amount from about 70 wt. % to about 90 wt. % of the antifogging composition. In certain other embodiments, the antifogging nonionic surfactant blend is present in an amount from about 75 wt. % to about 85 wt. % of the antifogging composition.

Examples of additional suitable combinations of materials for use in embodiments of the invention include, but are not limited to, from about 70 wt. % to about 90 wt. % antifogging nonionic surfactant blend and from about 10 wt. % to about 30 wt. % acetone; from about 80 wt. % to about 90 wt. % antifogging nonionic surfactant blend and from about 10 wt. % to about 20 wt. % acetone.

The first component of the antifogging nonionic surfactant blend (i.e., the fatty acid ester) may be present in an amount ranging from about 25 wt. % to about 90 wt. % of the antifogging nonionic surfactant blend. In other embodiments, the fatty acid ester component of the antifogging nonionic surfactant blend may be present in an amount ranging from 50 wt. % to about 80 wt. % of the antifogging nonionic surfactant blend.

The fatty acid ester component of the antifogging nonionic surfactant may be any suitable sorbitan ester. The sorbitan ester may be, but is not limited to, sorbitan monolaurate. Where a sorbitan monolaurate is used as the fatty acid ester component of the antifogging nonionic surfactant blend, the sorbitan monolaurate may be an ethoxylated sorbitan monolaurate.

One suitable sorbitan monolaurate for use in the present invention is available under the trade name Atmer® 100 from Ciba Specialty Chemicals of Tarrytown, N.Y. Atmer® 100 has a specific gravity of 1.0 g/mL and a vapor pressure below 1.0 mm Hg at 20° C.

As discussed above, the second component of the antifogging nonionic surfactant blend is an ethoxylated compound. In one embodiment, the antifogging nonionic surfactant blend comprises a mixture of an ethoxylated alkyl phenol and a mixed glyceride with a $C_8$ to $C_{20}$ fatty acid adduct. The ethoxylated alkyl phenol may have less than about 14 units of ethylene oxide per molecule. The ethoxylated alkyl phenol may be an ethoxylated nonyl phenol. The mixed glyceride may be a mixed glyceride with $C_{12}$ to $C_{16}$ fatty acid adduct. The mixed glyceride may also be a mixture of sorbitan monolaurate, sorbitan monopalmitate, sorbitan monostearate, sorbitan monooleate, and mixtures thereof It is contemplated that other materials may be added to the second component of the antifogging nonionic surfactant blend.

The second component of the antifogging nonionic surfactant blend may be present in the antifogging compositions in an amount ranging from about 10 wt. % to about 75 wt. %. In other embodiments, the second component of the antifogging nonionic surfactant blend may be present in an amount ranging from 20 wt. % to about 50 wt. %.

One suitable ethoxylated compound for use in the antifogging nonionic surfactant blend is available under the trade name Atmer® 645 from Ciba Specialty Chemicals of Tarrytown, N.Y. Atmer® 645 has a specific gravity of 1.05 g/mL and a vapor pressure below 1.0 mm Hg at 20° C. Atmer® 645 is a mixture of an ethoxylated alkyl phenol with less than about 14 units of ethylene oxide and a mixed glyceride with a $C_8$ to $C_{20}$ fatty acid adduct. The ethoxylated alkyl phenol of Atmer® 645 is an ethoxylated nonyl phenol. The mixed glyceride of Atmer® 645 can be a mixture of sorbitan monolaurate, sorbitan monopalmitate, sorbitan monostearate, and lisorbitan monooleate.

In one embodiment, the blend ratio of sorbitan monolaurate component to the mixture of ethoxylated alkyl phenol and mixed glyceride is about 1:1. In another embodiment, the blend ratio of sorbitan monolaurate component to the mixture of ethoxylated alkyl phenol and mixed glyceride is about 1:2. In still another embodiment, the blend ratio of sorbitan monolaurate component to the mixture of ethoxylated alkyl phenol and mixed glyceride is about 2:1.

The amount of the mixture of ethoxylated alkyl phenol and mixed glyceride that is present in the antifogging nonionic surfactant blend can range from about 30 wt % to about 70 wt % of the total antifogging nonionic surfactant blend. For example, other compatible hydrophilic materials may be used in the antifogging nonionic surfactant blend without detracting from the properties of the fatty acid ester component of the antifogging nonionic surfactant blend and the ethoxylated phenol and ester mixture In addition to a solvent and an antifogging nonionic surfactant blend, the antifogging composition may further contain additional components such as, but not limited to, antimicrobial agents and other additives to add or enhance the desired properties of the inventive antifogging compositions. The use of these optional components and the desired amounts of each component is based upon the desired properties of the antifogging composition such as the viscosity of the antifogging composition; the shelf life of the antifogging composition, and the means used to apply the antifogging composition to the surface of the food packaging container.

The antifogging nonionic surfactant blend which is used to make the antifogging composition may be prepared by combining or mixing the first component of the antifogging nonionic surfactant blend (i.e., the fatty acid ester) and the second component of the antifogging nonionic surfactant blend (i.e., the ethoxylated compound). The antifogging nonionic surfactant blend may be mixed with the solvent to form the antifogging composition. The antifogging composition is not limited to a particular order of mixing of the materials used in the antifogging composition.

The resulting antifogging compositions may be applied to the surface or surfaces of food packaging containers at room temperature. Because the antifogging compositions are liquid in form and easily handled, the antifogging compositions may be applied to the surface(s) of food packaging containers without heating the antifogging compositions.

The antifogging compositions may optionally be heated to temperatures ranging from about 100° F. (38° C.) to about 160° F. (71° C.) and applied at the heated temperature to the surface(s) of the food packaging container. Where a heating step is employed, the antifogging composition may be warmed in a pressurized liquid spray system such as Nordson® Corps Airless available from Nordson Corporation or air assisted spray equipment. The temperature which is selected depends upon a variety of factors such as the desired viscosity of the antifogging composition, the desired spraying properties of the antifogging composition, the desired drying time of the antifogging composition, and the desired degree of dispersing of the components of the antifogging composition.

The desired coating weight of the antifogging compositions on the food packaging container surface(s) depends upon a variety of factors such as, but not limited to, the composition of the surface upon which the antifogging composition is applied, the weight of the surface upon which the antifogging composition is applied, the components of the antifogging composition, and the desired drying time of the antifogging composition. For a typical container surface, the antifogging compositions may be applied in an amount of about 0.3 to about 3.0 grams/square meter ($g/m^2$). In other embodiments, the antifogging compositions may be applied in an amount of about 1.0 to about 2.0 grams/square meter ($g/m^2$).

Upon being applied to the food packaging container surface, the solvent component of the antifogging composition evaporates within seconds to minutes. An optional drying step may be employed to further speed up the drying of the antifogging composition and the evaporation of the solvent component. The evaporation of the solvent leaves a dry coating of antifog on the surface of the food packaging container. The amount of solvent which remains on the surface of the food packaging container ranges from about 0.1 wt. % to about 0.01 wt. %. The concentration of solvent on the food packaging container surface is substantially small such that the solvent does not cause damage to the food packaging container surface. Once applied to the food packaging container surface, the antifogging compositions described herein operate to alleviate the formation of condensation droplets and the accumulation of fog on the surfaces of food packaging containers during warming.

EXAMPLE 1

The viscosity of a sample of Atmer® 674 (Composition 1) was measured at a variety of temperatures using a Brookfield viscometer. The results of these measurements are shown in Table A.

TABLE A

| Temperature (° F.) | Temperature (° C.) | Viscosity (centipoise (cPs)) (spindle 4 @ 10 rpm) |
|---|---|---|
| 70 | 21 | 1508 |
| 90 | 32 | 630 |
| 122 | 50 | 199 |
| 136 | 58 | 138 |
| 172 | 78 | 72 |

Five antifogging compositions (Compositions 2–6) were formed by mixing Atmer® 674 (Composition 1) with varying amounts of acetone from Fisher Scientific at room temperature. Compositions 2–6 contained 5.2, 8.2, 11.5, 15.0, and 20.9 weight percent of acetone, respectively. A sixth composition (Composition 1 described above) contained Atmer® 674 without any acetone. The viscosity of Compositions 1–6 were measured at 70° F. (21° C.). The results of these measurements are shown in Table B.

TABLE B

| Composition | Weight Percent (wt. %) Acetone | Weight Percent (wt. %) Atmer® 674 | Viscosity (centipoise (cPs)) (spindle 4 @ 10 rpm) |
|---|---|---|---|
| 1 | 0.0 | 100.0 | 1508 |
| 2 | 5.2 | 94.8 | 417 |
| 3 | 8.2 | 91.8 | 213 |
| 4 | 11.5 | 88.5 | 152 |
| 5 | 15.0 | 85.0 | 101 |
| 6 | 20.9 | 79.1 | 62 |

As can be seen from the data shown in Tables A and B, at approximately 20 wt. % acetone, Composition 6 exhibited a viscosity similar to the undiluted Atmer 674 (Composition 1) at 172° F. (78° C.).

While the invention has been described with respect to a number of limited embodiments, variations and modifications exist. For example, although the invention is described with reference to food packaging containers, other surfaces or substrates can be defogged using the compositions and methods described herein. It is contemplated that the compositions and methods described herein can be used on any surface requiring fog reduction or elimination. The appended claims intend to cover all such variations and modifications as falling within the scope of the invention as described herein.

What is claimed is:

1. An antifogging composition for reducing fog in a food packaging container comprising:
   an antifogging nonionic surfactant blend comprising a sorbitan ester and an ethoxylated alkyl phenol; and
   solvent.

2. The antifogging composition of claim 1, wherein the food packaging container includes a surface comprising a polymeric substrate.

3. The antifogging composition of claim 2, wherein the polymeric substrate is polystyrene.

4. The antifogging composition of claim 2, wherein the polymeric substrate is selected from polypropylene and polyethylene terephthalate.

5. The antifogging composition of claim 1, wherein the solvent comprises from about 5 wt % to about 50 wt. % of the antifogging composition.

6. The antifogging composition of claim 1, wherein the antifogging composition has a viscosity ranging from about 20 centipoise to about 500 centipoise at room temperature.

7. The antifogging composition of claim 1, wherein the antifogging nonionic surfactant blend has a viscosity ranging from about 500 centipoise to about 1500 centipoise at room temperature.

8. The antifogging composition of claim 1, wherein the sorbitan ester is sorbitan monolaurate.

9. The antifogging composition of claim 1, wherein the ethoxylated alkyl phenol is in a mixture including a mixed glyceride with a $C_8$ to $C_{20}$ fatty acid adduct.

10. The antifogging composition of claim 1, wherein the antifogging nonionic surfactant blend comprises from about 50 wt. % to about 95 wt. % of the antifogging composition.

11. The antifogging composition of claim 1, wherein the solvent is acetone.

12. The antifogging composition method of claim 1, wherein the solvent is selected from acetone, methyl acetate, isopropyl alcohol, ethanol, and any mixture thereof.

13. A method of defogging a surface of a food packaging container comprising:
   selecting a surface for defogging;
   providing (i) an antifogging nonionic surfactant blend comprising a sorbitan ester and an ethoxylated alkyl phenol and (ii) solvent to form an antifogging composition; and
   applying the antifogging composition to the surface.

14. The method of claim 13, further including the step of drying the antifogging composition.

15. The method of claim 13, wherein the step of applying is accomplished by spraying the antifogging composition onto the surface.

16. The method of claim 13, wherein the step of applying is accomplished by wiping the antifogging composition onto the surface.

17. The method of claim 13, wherein the surface is a polymeric surface.

18. The method of claim 17, wherein the polymeric substrate is polystyrene.

19. The method of claim 17, wherein the polymeric substrate is selected from polypropylene and polyethylene terephthalate.

20. The method of claim 13, wherein the solvent comprises from about 5 wt. % to about 50 wt. % of the antifogging composition.

21. The method of claim 13, wherein the antifogging composition has a viscosity ranging from about 20 centipoise to about 500 centipoise at room temperature.

22. The method of claim 13, wherein the antifogging nonionic surfactant blend has a viscosity ranging from about 500 centipoise to about 1500 centipoise at room temperature.

23. The method of claim 13, wherein the antifogging nonionic surfactant blend comprises from about 50 wt. % to about 95 wt. % of the antifogging composition.

24. The method of claim 13, wherein the ethoxylated alkyl phenol is in a mixture including a mixed glyceride with a $C_8$ to $C_{20}$ fatty acid adduct.

25. The method of claim 13, wherein the sorbitan ester is sorbitan monolaurate.

26. The method of claim 13, wherein the solvent is acetone.

27. The method of claim 13, wherein the solvent is selected from acetone, methyl acetate, isopropyl alcohol, ethanol, and any mixture thereof.

* * * * *

UNITED STATES PATENT AND TRADEMARK OFFICE
CERTIFICATE OF CORRECTION

PATENT NO. : 6,923,997 B2 Page 1 of 1
DATED : August 2, 2005
INVENTOR(S) : Patchen It is certified that error appears in the above-identified patent and that said Letters Patent is hereby corrected as shown below:

<u>Column 10,</u>
Line 17, after "The antifogging composition", delete "method".

Signed and Sealed this

Thirteenth Day of September, 2005

JON W. DUDAS
*Director of the United States Patent and Trademark Office*